(12) United States Patent
Wang (10) Patent No.: US 10,848,090 B2
(45) Date of Patent: Nov. 24, 2020

(54) CONTROL METHODOLOGY TO REDUCE MOTOR DRIVE LOSS

(71) Applicant: Toyota Motor Engineering & Manufacturing North America, Inc., Plano, TX (US)

(72) Inventor: Chi-Ming Wang, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 54 days.

(21) Appl. No.: 16/022,105

(22) Filed: Jun. 28, 2018

(65) Prior Publication Data
US 2020/0007064 A1    Jan. 2, 2020

(51) Int. Cl.
*H02P 23/00* (2016.01)
*B60W 20/10* (2016.01)
(Continued)

(52) U.S. Cl.
CPC ......... *H02P 23/0031* (2013.01); *B60W 20/10* (2013.01); *G07C 5/085* (2013.01); *H02P 23/0013* (2013.01); *H02P 23/0018* (2013.01); *H02P 23/14* (2013.01); *B60K 6/26* (2013.01); *B60W 2510/081* (2013.01); *B60W 2510/083* (2013.01); *B60W 2540/10* (2013.01)

(58) Field of Classification Search
CPC ............. H02P 23/0013; H02P 23/0018; H02P 23/0031; H02P 23/14; B60W 20/10; B60W 20/11; B60W 20/12; B60W 20/20; B60W 20/30; B60W 2510/082; B60W 2510/081; B60W 2510/083; B60W 2510/084
See application file for complete search history.

(56) References Cited

U.S. PATENT DOCUMENTS 4,392,100 A * 7/1983 Stanton ............... H02P 23/0027
                                                                  318/803
6,021,369 A   2/2000 Kamihira et al.
(Continued)

OTHER PUBLICATIONS

Eskander, M.N. "Minimization of Losses in Permanent Magnet Synchronous Motors Using Neural Network" Journal of Power Electronics, 2 (3), pp. 220.229; Jul. 2002.
(Continued)

*Primary Examiner* — Anne Marie Antonucci
*Assistant Examiner* — Andrew J Cromer
(74) *Attorney, Agent, or Firm* — Snell & Wilmer LLP (57) ABSTRACT

A system for reducing at least one of motor loss or motor drive loss in a vehicle. The system includes a motor designed to convert electrical energy into torque. The system also includes a sensor designed to detect motor data corresponding to at least one of a motor torque or a motor speed of the motor. The system also includes a memory designed to store testing data including optimized current commands for multiple combinations of motor torques that were determined during testing of the motor or a similar motor. The system also includes a speed or torque controller coupled to the motor, the sensor, and the memory and designed to receive a speed or torque command and to determine a current command signal usable to control the motor based on the speed or torque command, the testing data, the detected motor data, and an artificial intelligence algorithm.

18 Claims, 6 Drawing Sheets

(51) Int. Cl.
*G07C 5/08* (2006.01)
*H02P 23/14* (2006.01)
*B60K 6/26* (2007.10)

(56) References Cited

U.S. PATENT DOCUMENTS

| | | | |
|---|---|---|---|
| 6,064,996 | A | 5/2000 | Yamaguchi et al. |
| 6,216,083 | B1 | 4/2001 | Ulyanov et al. |
| 6,416,437 | B2 | 7/2002 | Jung |
| 6,711,556 | B1* | 3/2004 | Sepe, Jr. ............ G05B 13/0275 706/1 |
| 7,487,030 | B2 | 2/2009 | Heap et al. |
| 7,783,409 | B2 | 8/2010 | Kang et al. |
| 7,953,521 | B2 | 5/2011 | Tipping et al. |
| 7,954,579 | B2* | 6/2011 | Rodriguez ............ B60W 10/08 180/65.265 |
| 7,987,934 | B2 | 8/2011 | Huseman |
| 8,556,011 | B2 | 10/2013 | Anwar et al. |
| 8,688,309 | B2 | 4/2014 | Baughman et al. |
| 8,825,294 | B2 | 9/2014 | Norris et al. |
| 8,868,252 | B2 | 10/2014 | Heap et al. |
| 2006/0293817 | A1 | 12/2006 | Hagiwara et al. |
| 2009/0189553 | A1* | 7/2009 | Arnet ..................... H02P 21/22 318/400.3 |
| 2017/0120915 | A1 | 5/2017 | David et al. |
| 2017/0346433 | A1* | 11/2017 | Bazzi ..................... H02P 23/02 |

OTHER PUBLICATIONS

Yatim, A.H.M. et al. "Efficiency Optimization of Variable Speed Induction Motor Drive Using Online Backpropagation" In Power and Energy Conference 2006; PECon'06, IEEE International ; pp. 441-446, Dec. 2006.

Sun, T. et al. "Maximum Torque Per Ampere (MTPA) Control for Interior Permanent Magnet Synchronous Machine Drives Based on Virtual Signal Injection" IEEE Transactions on Power Electronics, 30 (9), pp. 5036-5045; Sep. 2015.

http://wwwlea.upb.de; "Optimum Efficiency Control of Interior Permanent Magnet Synchronous Motors in Drive Trains of Electric and Hybrid Vehicles"; Wilhelm Peters et al.

* cited by examiner

CONTROL METHODOLOGY TO REDUCE MOTOR DRIVE LOSS

BACKGROUND

1. Field

The present disclosure relates to systems and methods for controlling a motor-generator of a vehicle to reduce motor loss and motor drive loss of the motor-generator.

2. Description of the Related Art

Electric and hybrid vehicles include motors or motor-generators that convert electricity into mechanical power for propelling the vehicle. Efficiency of such motors may be affected by various aspects of the motor such as switching loss, copper loss, and iron loss. When power between components is switched or modulated, power may be dissipated, which is referred to as a switching loss. Copper loss refers to the loss of energy as heat is produced by electrical current in the conductors of the motors. Iron loss refers to current that gets induced in a core of the motor which results in eddy current loss and hysteresis loss. As motor efficiency increases, vehicle ranges increase and their operating costs decrease. Thus, it is desirable to decrease motor loss and motor drive loss in electric motors used to power vehicles.

SUMMARY

Described herein is a system for reducing at least one of motor loss or motor drive loss in a vehicle. The system includes a motor designed to convert electrical energy into torque. The system also includes a sensor designed to detect motor data corresponding to at least one of a motor torque or a motor speed of the motor. The system also includes a memory designed to store testing data including optimized current commands for multiple combinations of motor torques that were determined during testing of the motor or a similar motor. The system also includes a speed or torque controller coupled to the motor, the sensor, and the memory and designed to receive a speed or torque command and to determine a current command signal usable to control the motor based on the speed or torque command, the testing data, the detected motor data, and an artificial intelligence algorithm.

Also described is a system for reducing at least one of motor loss or motor drive loss in a vehicle. The system includes a motor designed to convert electrical energy into torque. The system also includes a sensor designed to detect motor data corresponding to at least one of a motor torque or a motor speed of the motor. The system also includes a memory designed to store learned data including previously detected or determined motor torques and motor speeds and corresponding current command signals that resulted in the previously detected or determined motor torques and motor speeds, and testing data including optimized current commands for multiple combinations of motor torques and motor speeds. The system also includes a speed or torque controller coupled to the motor, the sensor, and the memory and configured to receive a speed or torque command and to determine a current command signal usable to control the motor based on the speed or torque command, the learned data, the testing data, and an artificial intelligence algorithm.

Also described is a method for reducing at least one of motor loss or motor drive loss in a vehicle. The method includes detecting, by a sensor, motor data corresponding to at least one of a motor torque or a motor speed of a motor. The method also includes storing, in a memory, testing data including optimized current commands for multiple combinations of motor torques that were determined during testing of the motor or a similar motor. The method also includes receiving, by a speed or torque controller, a speed or torque command. The method also includes determining, by the speed or torque controller, a current command signal usable to control the motor based on the speed or torque command, the testing data, the detected motor data, and an artificial intelligence algorithm.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for controlling motor-generators of vehicles. The systems provide several benefits and advantages such as reducing at least one of motor loss or motor drive loss of motor-generators. These systems include a memory that stores test data that includes optimized current command signals for controlling the motor-generator at multiple combinations of motor torques and motor speeds (i.e., at multiple operating conditions). This advantageously results in optimal control of the motor-generator at the operating conditions. The systems further include a speed or torque controller that runs an artificial intelligence algorithm which advantageously determines optimized current command signals for operating conditions other than those stored in the memory. The artificial intelligence algorithm advantageously updates itself in response to changing motor conditions, thus providing the benefit of continued optimal control of the motor-generator. This advantageously allows the quantity of test data that is determined to be significantly less than in conventional motor control systems which require a lot of test data because they do not continuously learn based on learned data.

An exemplary system includes a motor-generator along with one or more sensor capable of detecting data corresponding to a speed and/or a torque of the motor-generator. This system also includes a memory that stores test data that was determined during benchtop testing of the motor-generator or a similar motor-generator. The system also includes an accelerator pedal that receives an acceleration request from a driver. The system further includes an electronic control unit (ECU) that includes a speed or torque controller. The speed or torque controller runs an artificial intelligence algorithm that receives a speed or torque command that corresponds to the acceleration request and determines a current command signal for controlling the motor-generator based on the test data, the detected data, and the speed or torque command.

Figure 1:
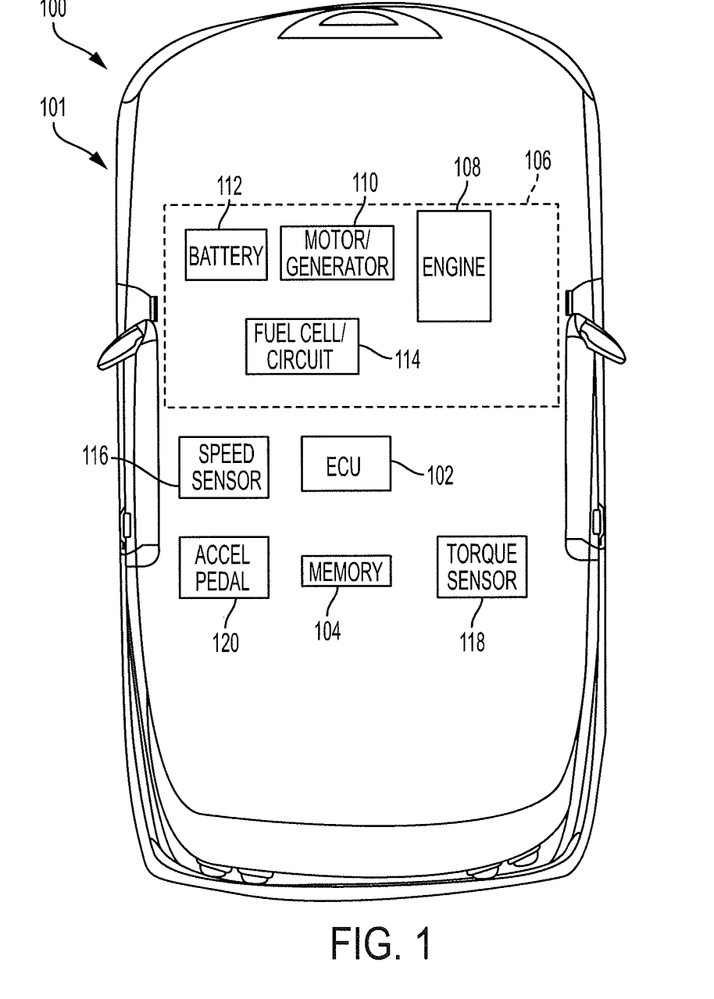
FIG. 1 is a block diagram illustrating a vehicle that includes a system for reducing at least one of motor loss or motor drive loss in a motor-generator of the vehicle according to an embodiment of the present invention.

Turning to FIG. 1, a vehicle 100 includes a system 101 for reducing at least one of motor loss or motor drive loss. The vehicle 100 (or system 101) may include an ECU 102, a memory 104, and a power source 106. The vehicle 100 (or system 101) may further include a speed sensor 116, a torque sensor 118, and an accelerator pedal 120.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations.

In some embodiments, the vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination.

The memory 104 may include any non-transitory memory and may be capable of storing data usable by the ECU 102. For example, the memory 104 may store instructions usable by the ECU 102.

The power source 106 may include any one or more of an engine 108, a motor-generator 110, a battery 112, or a fuel-cell circuit 114. The engine 108 may convert a fuel into mechanical power for propelling the vehicle 100. In that regard, the engine 108 may be a gasoline engine, a diesel engine, or the like.

The battery 112 may store electrical energy. In some embodiments, the battery 112 may include any one or more energy storage device including a battery, a flywheel, a super capacitor, a thermal storage device, or the like.

The fuel-cell circuit 114 may include a plurality of fuel cells that facilitate a chemical reaction to generate electrical energy. For example, the fuel cells may receive hydrogen and oxygen, facilitate a reaction between the hydrogen and oxygen, and output electricity in response to the reaction. In that regard, the electrical energy generated by the fuel-cell circuit 114 may be stored in the battery 112. In some embodiments, the vehicle 100 may include multiple fuel-cell circuits including the fuel-cell circuit 114.

The motor-generator 110 may convert the electrical energy stored in the battery 112 (or electrical energy received directly from the fuel-cell circuit 114) into mechanical power usable to propel the vehicle 100. The motor-generator 110 may further convert mechanical power received from the engine 108 or from the wheels of the vehicle 100 into electricity, which may be stored in the battery 112 as energy and/or used by other components of the vehicle 100. In some embodiments, the motor-generator 110 may include a motor without a generator portion.

In some embodiments, the motor-generator 110 may include an interior permanent magnet synchronous motor (IPMSM). The motor may have the following parameters: Ld (D-axis inductance)=0.0016, Lq (Q-axis inductance) =0.00206, J (motor inertia)=0.0226 kgm2, theta (flux generated by the permanent magnet)=0.1757 Wb.

The speed sensor 116 may include any sensor capable of detecting data that corresponds to a rotational speed of the motor-generator 110. For example, the speed sensor 116 may include an angular speed sensor capable of detecting radians or rotations per second of the motor-generator 110.

The torque sensor 118 may include any sensor capable of detecting data that corresponds to an amount of torque generated by the motor-generator 110.

In some embodiments, the ECU 102 may determine or predict one or both of the motor speed or the motor torque based on data received from the speed sensor 116 and data received from the torque sensor 118.

The accelerator pedal 120 may include any pedal or other input device that can receive data corresponding to an acceleration request by a driver. In some embodiments, the vehicle 100 may be fully autonomous and may fail to include the accelerator pedal 120. In other embodiments, the ECU 102 may receive an acceleration request from the accelerator pedal 120 and may generate or determine a speed or torque command corresponding to a desired motor speed of the motor-generator 110 or motor torque of the motor-generator 110 based on the acceleration request. In some embodiments, the ECU 102 may determine a speed command and, in some embodiments, the ECU 102 may determine a torque command.

The ECU 102 may further determine a current command signal usable to control the motor-generator 110 based on the determined speed or torque command. The ECU 102 may determine the current command signal based on a combination of data stored in the memory, data detected by the speed sensor 116 and the torque sensor 118, and an artificial intelligence algorithm such as an artificial neural network (ANN) algorithm or a fuzzy logic algorithm. A portion of the determination may be based on testing data that is stored in the memory 104 and was determined prior to installation of the motor-generator 110 in the vehicle 100.

Figure 2:
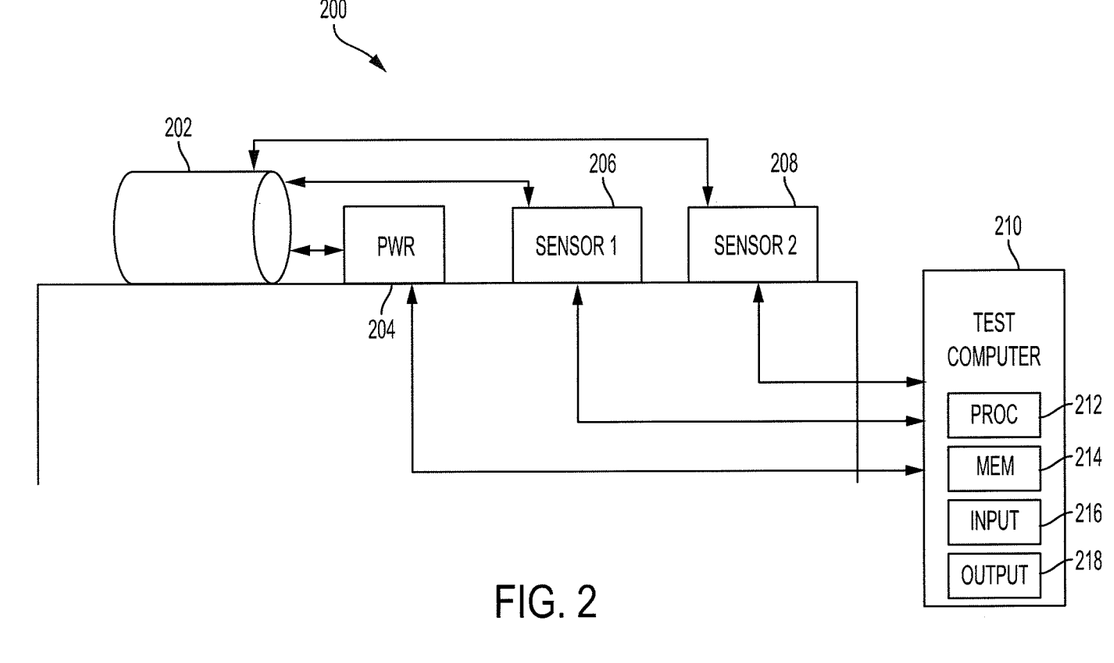
FIG. 2 is a block diagram illustrating a test bench for determining test data that corresponds to current command signals at various operating conditions for a motor-generator according to an embodiment of the present invention.

In that regard and referring to FIG. 2, a test bench 200 is illustrated. The test bench 200 includes a physical motor-generator 202 that is similar to the motor-generator 110 of FIG. 1. The test bench 200 further includes a power source 204 for powering the motor-generator 202. The test bench 200 further includes a first sensor 206, such as a motor speed sensor for detecting a motor speed, and a second sensor 208, such as a motor torque sensor for detecting a motor torque. The test bench 200 further includes a test computer 210 which may include a processor 212, a non-transitory memory 214, an input device 216, and an output device 218.

An operator may interface with the test bench 200 using the test computer 210. In particular, the operator may provide inputs via the input device 216 and may receive outputs via the output device 218. For example, the input device 216 may include a keyboard, a touchscreen, a microphone, or the like. The output device 218 may include, for example, a speaker, a display, a touchscreen, or the like.

An operator may provide various operating conditions (i.e., combinations of motor speeds and motor torques of the motor-generator 202) and may identify optimized current commands for the multiple operating conditions. An optimized current command corresponds to a current command signal that is provided to the motor-generator 202 which results in least loss of the motor-generator 202 (i.e., an optimized current command may be considered the most efficient current command for the given operating condition).

For example, an operator may provide an operating condition via the input device 216 and may cause the power source 204 to provide various current command signals to the motor-generator 202 to achieve the operating condition with minimal loss. The sensors 206, 208 may be used to detect the operating condition (i.e., combination of motor speed and motor torque), and the resulting current command signal and operating condition may be output via the output device 218. The operator, or the processor 212, may select a current command signal that results in the least motor loss or motor drive loss at the given operating condition.

In some embodiments, the processor 212 may automatically perform an algorithm that controls the motor-generator 202 to identify optimized current command signals for various operating conditions. The optimized current command signals for the various operating conditions may be stored in the memory 214.

Although using a test bench 200 to identify optimized current command signals may reduce at least one of motor loss or motor drive loss, it is impractical to identify optimized current command signals for all continuous operating conditions of the motor-generator 202. In that regard, the test bench 200 may be used to identify a set of test data that the ECU 102 of FIG. 1 may use in addition to detected data and an artificial intelligence algorithm to determine current command signals for operating conditions that are not provided.

Figure 3:
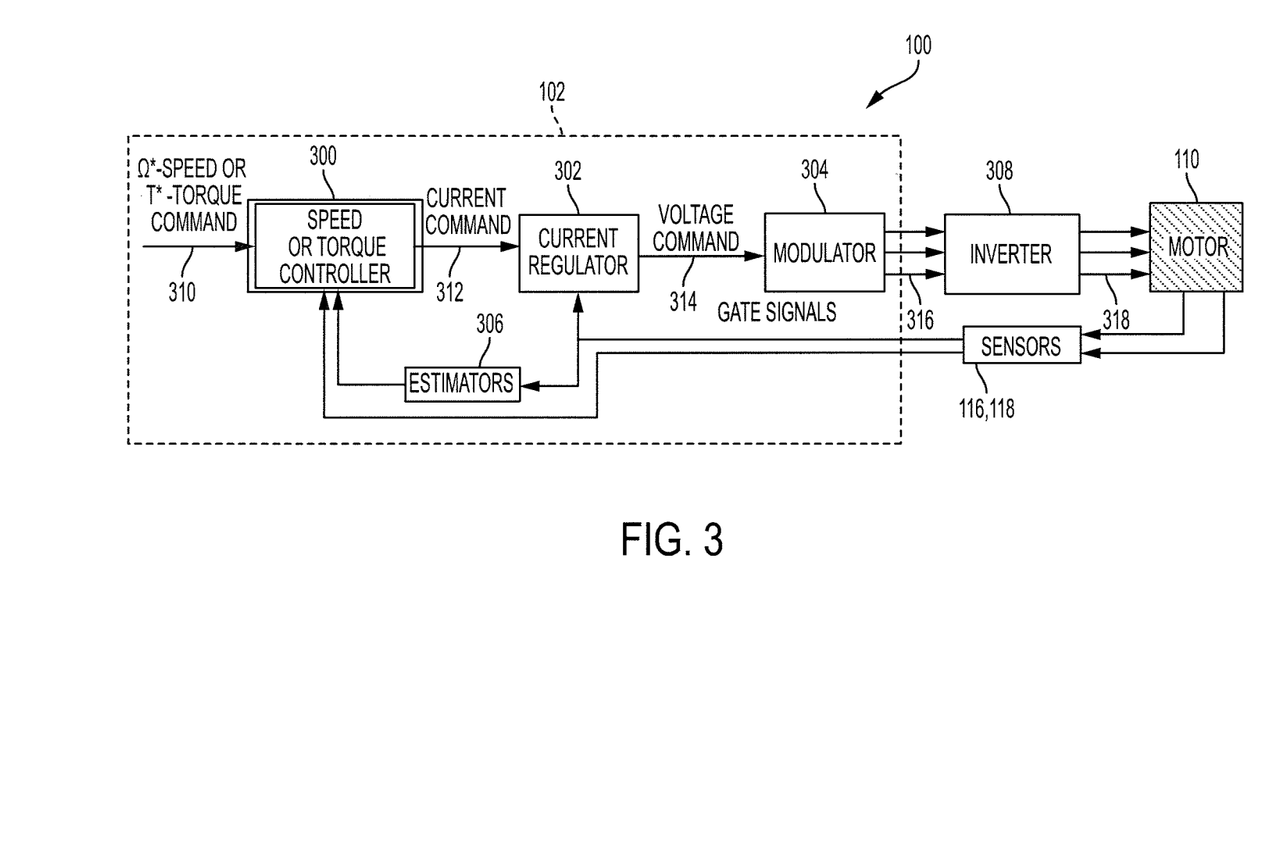
FIG. 3 is a block diagram illustrating various components of an electronic control unit (ECU) of the system of FIG. 1 according to an embodiment of the present invention.

Turning now to FIG. 3, specific control of the motor-generator 110 by the ECU 102 is shown. In particular, the ECU 102 may include a speed or torque controller 300, a current regulator 302, a modulator 304, and an estimator 306. The vehicle 100 may further include an inverter 308 along with the motor-generator 110 and the sensors 116, 118.

Referring to FIGS. 1 and 3, the speed or torque controller 300 may receive a speed or torque command 310. For example, the speed or torque command may correspond to a desired speed or torque of the motor-generator 110. The ECU 102 may determine the speed or torque command 310 based on input received via the accelerator pedal 120. For example, a greater depression of the accelerator pedal 120 may correspond to a greater speed or torque command 310.

The speed or torque controller 300 may receive the speed or torque command 310 and may determine a current command signal 312 based on the speed or torque command 310. For example, the speed or torque controller 300 may determine the current command signal 312 based on learned data (which includes previously detected or determined motor torques and motor speeds (i.e., operating conditions) and corresponding current command signals that resulted in the operating conditions). The speed or torque controller 300 may further determine the current command signal 312 based on testing data (which includes optimized current commands for specific operating conditions that were identified using the test bench 200 of FIG. 2). The speed or torque controller 300 may further determine the current command signal 312 using an artificial intelligence algorithm with the speed or torque command 310, the learned data, and the testing data as inputs. The artificial intelligence algorithm may continuously update or learn based on additional data detected by the sensors 116, 118 and the corresponding current command signals 312.

The current regulator 302 may receive the current command signal 312 and may output a voltage command signal 314 based on the current command signal. The modulator 304 may receive the voltage command signal 314 and may output modulated gate signals 316.

The inverter 308 uses the modulated gate signals 316 to convert direct current (DC) power into alternating current (AC) power.

In some embodiments, the estimator 306 may receive the detected speed data and torque data from the speed sensor 116 and the torque sensor 118 and may estimate a motor speed and a motor torque based on the speed data and the torque data. In some embodiments, the estimator 306 may only estimate one of the motor speed or the motor torque. In some embodiments, the estimator 306 may not exist and the speed or torque controller 300 may use data directly from the speed sensor 116 and the torque sensor 118.

Figure 4:
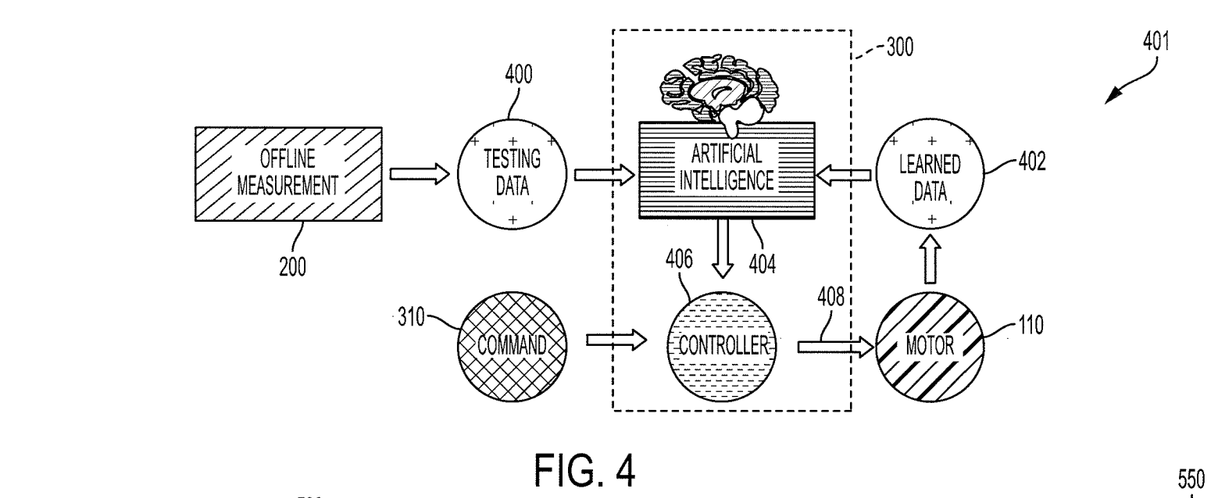
FIG. 4 is a block diagram illustrating an exemplary algorithm for controlling a motor-generator of a vehicle to reduce at least one of motor loss or motor drive loss according to an embodiment of the present invention.

Referring now to FIGS. 1 and 4, a system diagram 401 illustrates use of learned data, testing data, and an artificial intelligence algorithm to control the motor-generator 110. In particular, the test bench 200 of FIG. 2 may be used to identify testing data 400. The testing data may include optimized current command signals for multiple combinations of motor torques and motor speeds. Additionally, the speed sensor 116 and torque sensor 118 may be used to determine learned data 402. The learned data 402 may include actual motor torques and motor speeds that resulted from specific current command signals.

The speed or torque controller 300 may include an artificial intelligence algorithm 404 along with a control algorithm 406. The speed or torque controller 300 may receive the testing data 400, the learned data 402, and a speed or torque command signal 310. The artificial intelligence algorithm 400 may receive the testing data 400, the learned data 402, and the speed or torque command 310. The artificial intelligence algorithm 400 or the controller 406 may use the testing data 400, the learned data 402, and the speed or torque command 310 to identify an optimized current command signal 408. The artificial intelligence algorithm 400 or the controller 406 may output the optimized current command signal 408 to be used to control the motor-generator 110.

Figure 5A:
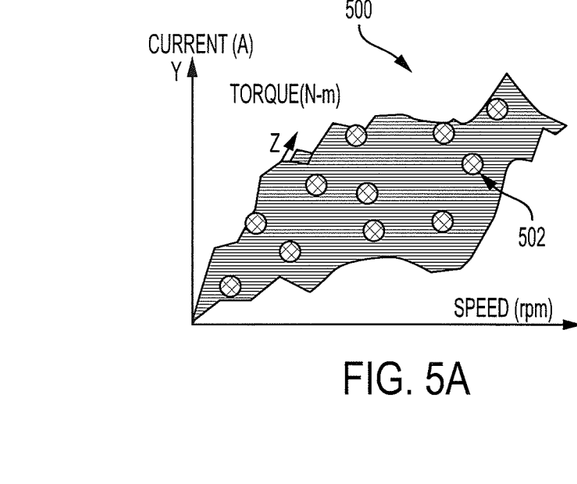
FIG. 5A is graph illustrating exemplary test data determined using a test bench similar to the test bench of FIG. 2 according to an embodiment of the present invention.

Referring to FIGS. 4 and 5A, a graph 500 illustrates exemplary test data that was obtained using a test bench similar to the test bench 200 of FIG. 2. In particular, the graph 500 includes a plurality of test points 502 that represent the testing data 400. Each of the plurality of test points 502 corresponds to a specific motor speed (X-axis), motor torque (Z-axis), and current command signal (Y-axis).

Figure 5B:
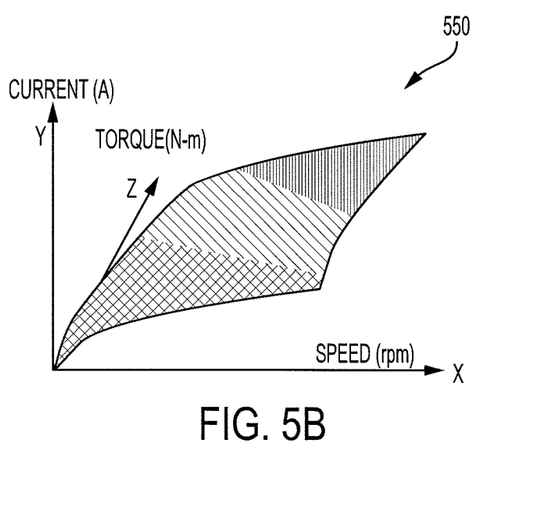
FIG. 5B is a graph illustrating exemplary current command signals for various operating conditions that were determined using an algorithm similar to the algorithm of FIG. 4 according to an embodiment of the present invention.

Referring now to FIGS. 4 and 5B, another graph 550 illustrates exemplary current command signals determined by the speed or torque controller 300. The graph 550 plots motor speed (X-axis), motor torque (Z-axis), and current command signals (Y-axis). Because the speed or torque controller uses the artificial intelligence algorithm 404 to determine the current command signal 408, the current command signal surface is non-discrete, meaning that the speed or torque controller 300 can identify or determine an optimized current command signal for any operating condition (i.e., any combination of motor speed and motor torque).

Figure 6:
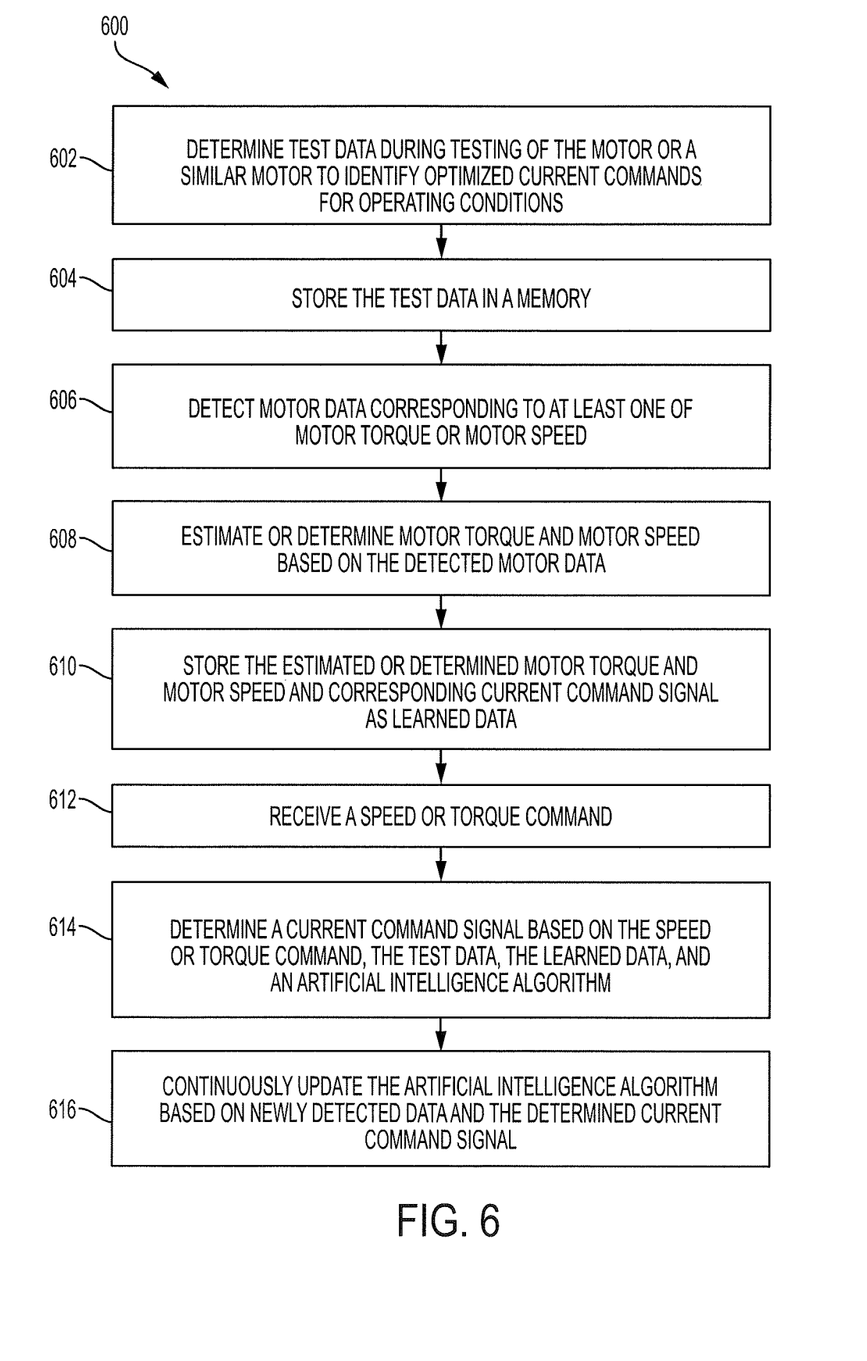
FIG. 6 is a flowchart illustrating a method for controlling a motor-generator to reduce at least one of motor loss or motor drive loss of the motor-generator according to an embodiment of the present invention.

Referring now to FIG. 6, a method 600 for reducing at least one of motor loss or motor drive loss in a vehicle is shown. The method 600 may be performed by a system similar to the system 101 of FIG. 1.

In block 602, a test bench may be used to determine test data. For example, a motor-generator may be placed on a test bench (which may include any test equipment) and optimized current command signals may be determined for various operating conditions (i.e. combinations of motor speed and motor torque). The test data may include the optimized current command signals along with the corresponding operating conditions for each of the current command signals. The motor-generator used in the testing may be a specific motor-generator that is used in a vehicle or may be a similar motor-generator as one that will be used in the vehicle.

In block 604, the test data may be stored in a memory of a vehicle. For example, the test data may be transferred to the memory of the vehicle via a removable memory, a network access device, or other programming of the memory of the vehicle.

In block 606, as the vehicle is being driven, motor data may be detected by one or more sensor. For example, a speed sensor may detect speed data that corresponds to a motor speed of the motor-generator of the vehicle. As another example, a torque sensor may detect torque data that corresponds to a torque that is generated by the motor-generator of the vehicle. In some embodiments, the speed sensor may detect the rotational speed of the motor-generator of the vehicle and, in some embodiments the speed sensor may detect other data that corresponds to the rotational speed of the motor-generator. In some embodiments, the torque sensor may detect torque that is generated by the motor-generator and, in some embodiments the torque sensor may detect other data that corresponds to the torque of the motor-generator.

In block 608, a speed or torque controller may estimate or determine a motor torque and a motor speed based on the detected motor data. For example, an estimator in the speed or torque controller may use one or both of the speed data or the torque data and calculate or estimate the motor speed or motor torque based on the detected motor data from block 606.

In block 610, the speed or torque controller may store the estimated or determined motor torque and motor speed along with a corresponding current command signal in the memory of the vehicle as learned data. For example, the speed or torque controller may have generated a current command signal that resulted in the current motor torque and motor speed. Thus, the current command signal resulted in the motor-generator operating at the current motor torque and motor speed, and all three are related.

In block 612, the speed or torque controller may receive a speed or torque command. The speed or torque command may correspond to a desired acceleration. For example, a driver may depress an accelerator pedal, requesting a certain amount of acceleration from the motor-generator. An ECU may identify a speed or torque command that corresponds to the requested acceleration, and may provide the speed or torque command to the speed or torque controller. In some embodiments, the ECU may identify or determine a speed command based on the requested acceleration and, and some embodiments, the ECU may identify or determine a torque command that corresponds to the requested acceleration.

In block 614, the speed or torque controller may determine a current command signal based on the speed or torque command, the test data, the learned data, and an artificial intelligence algorithm. For example, the speed or torque controller may provide the speed or torque command, the test data, and the learned data to the artificial intelligence algorithm as inputs. The artificial intelligence algorithm may then calculate or determine the current command signal that will cause the motor-generator to achieve the desired acceleration that corresponds to the speed or torque command based on these inputs. For example, in response to the speed or torque controller generating the current command signal, the motor-generator may achieve the desired acceleration with minimal motor loss or motor drive loss.

In block 616, the artificial intelligence algorithm may be continuously updated by the speed or torque controller based on newly detected motor data (corresponding to motor torque and motor speed) and corresponding current command signals. Because the artificial intelligence algorithm continuously updates, control of the motor-generator by the speed or torque controller continuously improves. Stated differently, because the artificial intelligence algorithm continuously updates, motor loss or motor drive loss is continuously reduced. Additionally, the motor-generator may begin to operate differently after a period of time due to degradation or other reasons. Because the artificial intelligence algorithm continuously updates, the control of the motor-generator continuously adapts to the changing operation of the motor-generator, further reducing at least one of motor loss or motor drive loss.

Figure 7A:
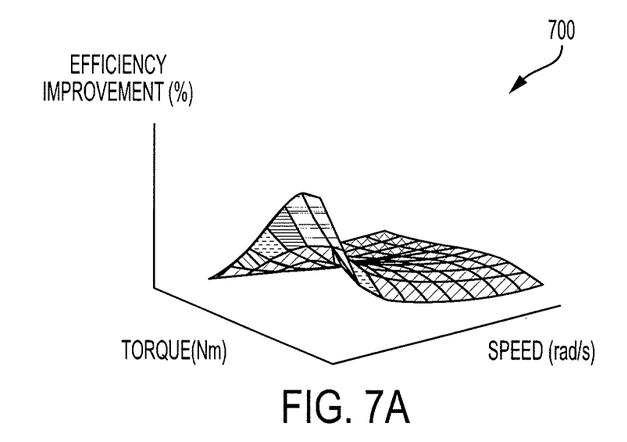
FIGS. 7A and 7B illustrate improvement in efficiency of a motor-generator before any parameter change and after a ten percent (10%) decrease of flux generated from the permanent magnet on the rotor, respectively, according to an embodiment of the present invention.

Referring now to FIG. 7A, a plot 700 illustrates improvement in motor loss or motor drive loss at various operating conditions (i.e., at various combinations of motor torque and motor speed) using the method 600 of FIG. 6. The improvement shown in the plot 700 corresponds to an improvement in motor loss or motor drive loss before any parameter change of a motor-generator as compared to initial control of the motor-generator using only test data. As shown, control of the motor-generator using the method 600 of FIG. 6 results in improved motor efficiency at all operating conditions, and especially at low speed conditions.

Figure 7B:
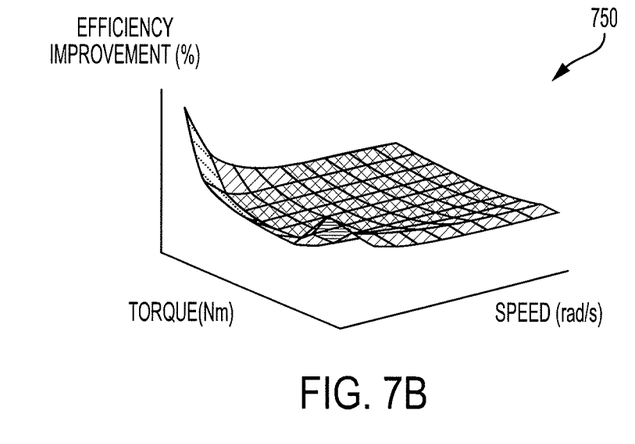

Turning to FIG. 7B, a plot 750 illustrates improvement in motor lot drive loss at various operating conditions using the method 600 of FIG. 6. The improvement shown in the plot 750 corresponds to an improvement in at least one of motor loss or motor drive loss during use of a motor-generator that has had a 10% decrease in decrease of flux generated from the permanent magnet on the rotor as compared to control of the degraded motor-generator using only test data. Again, it can be seen that control of the motor-generator using the method 600 of FIG. 6 results and improved motor efficiency at all operating conditions.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for reducing at least one of motor loss or motor drive loss in a vehicle comprising:
a motor configured to convert electrical energy into torque;
a sensor configured to detect motor data corresponding to at least one of a motor torque or a motor speed of the motor, the sensor including a speed sensor configured to detect the motor speed and a torque sensor configured to detect torque data corresponding to the motor torque;
a memory configured to store testing data including optimized current commands for multiple combinations of motor torques that were determined during testing of the motor or a similar motor;
an estimator controller configured to estimate the motor torque based on the detected torque data, the estimated motor torque corresponding to a present torque of the motor; and
a speed or torque controller coupled to the motor, the sensor, and the memory and configured to receive a speed or torque command and to determine a current command signal usable to control the motor based on the speed or torque command, the testing data, the detected motor speed, the estimated motor torque, and an artificial intelligence algorithm, the current command signal corresponding to a commanded amount of current.

2. The system of claim 1 wherein the artificial intelligence algorithm includes at least one of an artificial neural network or a fuzzy logic algorithm.

3. The system of claim 1 wherein the testing data was determined during the testing of the motor or the similar motor in a testing environment to identify the optimized current commands for the multiple combinations of the motor torques and the motor speeds.

4. The system of claim 1 wherein the memory is further configured to store the determined current command signal, the detected motor speed, and the estimated motor torque in the memory as learned data, and the speed or torque controller is further configured to receive a new speed or torque command and to determine a new current command signal based on the additional learned data in addition to the stored testing data.

5. The system of claim 1 wherein the speed or torque controller continuously updates the artificial intelligence algorithm based on the detected motor data and the current command signal.

6. The system of claim 1 further comprising:
an accelerator pedal sensor configured to receive an acceleration request corresponding to a requested acceleration of the vehicle; and
an electronic control unit (ECU) coupled to the accelerator pedal sensor and configured to determine the speed or torque command based on the acceleration request.

7. The system of claim 1 further comprising:
a current regulator configured to receive the current command signal and to output a voltage command signal based on the current command signal;
a modulator configured to receive the voltage command signal and to output a switching signal based on the voltage command signal; and
an inverter configured to receive the switching signal and to control the motor based on the switching signal.

8. A system for reducing at least one of motor loss or motor drive loss in a vehicle comprising:
a motor configured to convert electrical energy into torque;
a sensor configured to detect motor data corresponding to at least one of a motor torque or a motor speed of the motor, the sensor including a speed sensor configured to detect the motor speed and a torque sensor configured to detect torque data corresponding to the motor torque;
a memory configured to store:
learned data including previously detected or determined motor torques and motor speeds and corresponding current command signals that resulted in the previously detected or determined motor torques and motor speeds, and
testing data including optimized current commands for multiple combinations of motor torques and motor speeds;
an estimator controller configured to estimate the motor torque based on the detected torque data, the estimated motor torque corresponding to a present torque of the motor; and
a speed or torque controller coupled to the motor, the sensor, and the memory and configured to receive a speed or torque command and to determine a current command signal usable to control the motor based on the speed or torque command, the learned data, the testing data, the estimated motor torque, and an artificial intelligence algorithm, the current command signal corresponding to a commanded amount of current.

9. The system of claim 8 wherein the artificial intelligence algorithm includes at least one of an artificial neural network or a fuzzy logic algorithm.

10. The system of claim 8 wherein the testing data was determined during benchtop testing of the motor or a similar motor in a testing environment to identify the optimized current commands for the multiple combinations of the motor torques and the motor speeds.

11. The system of claim 8 wherein the memory is further configured to store the determined current command signal, the detected motor speed, and the estimated motor torque in the memory as additional learned data, and the speed or torque controller is further configured to receive a new speed or torque command and to determine a new current command signal based on the additional learned data.

12. The system of claim 8 wherein the speed or torque controller continuously updates the artificial intelligence algorithm based on the detected motor data and the current command signal.

13. The system of claim 8 further comprising:
an accelerator pedal sensor configured to receive an acceleration request corresponding to a requested acceleration of the vehicle; and
an electronic control unit (ECU) coupled to the accelerator pedal sensor and configured to determine the speed or torque command based on the acceleration request.

14. The system of claim 8 further comprising:
a current regulator configured to receive the current command signal and to output a voltage command signal based on the current command signal;
a modulator configured to receive the voltage command signal and to output a switching signal based on the voltage command signal; and
an inverter configured to receive the switching signal and to control the motor based on the switching signal.

15. A method for reducing at least one of motor loss or motor drive loss in a vehicle comprising:
- detecting, by a sensor, motor data corresponding to at least one of a motor torque or a motor speed of a motor, the sensor including a speed sensor and a torque sensor such that the motor data includes the motor speed and the motor torque;
- storing, in a memory, testing data including optimized current commands for multiple combinations of motor torques that were determined during testing of the motor or a similar motor;
- receiving, by a speed or torque controller, a speed or torque command;
- estimating, by an estimator controller, an estimated motor torque based on the detected torque data, the estimated motor torque corresponding to a present torque of the motor; and
- determining, by the speed or torque controller, a current command signal usable to control the motor based on the speed or torque command, the testing data, the detected motor speed, the estimated motor torque, and an artificial intelligence algorithm, the current command signal corresponding to a commanded amount of current.

16. The method of claim 15 further comprising determining the testing data during testing of the motor or a similar motor in a testing environment to identify the optimized current commands for the multiple combinations of the motor torques and the motor speeds.

17. The method of claim 15 further comprising:
- storing, in the memory, the determined current command signal, the detected motor speed, and the estimated motor torque as learned data;
- receiving, by the speed or torque controller, a new speed or torque command; and
- determining, by the speed or torque controller, a new current command signal based on the learned data in addition to the stored testing data.

18. The method of claim 15 further comprising continuously updating, by the speed or torque controller, the artificial intelligence algorithm based on the detected motor data and the current command signal.

* * * * *